(12) United States Patent
Liu et al.

(10) Patent No.: US 11,358,144 B2
(45) Date of Patent: Jun. 14, 2022

(54) MICROFLUIDIC DEVICE FOR SORTING OUT DROPLETS

(71) Applicant: IMEC VZW, Leuven (BE)

(72) Inventors: Chengxun Liu, Kessel-Lo (BE); Rodrigo Sergio Wiederkehr, Leuven (BE)

(73) Assignee: IMEC VZW, Leuven (BE)

( * ) Notice: Subject to any disclaimer, the term of this patent is extended or adjusted under 35 U.S.C. 154(b) by 105 days.

(21) Appl. No.: 16/472,841

(22) PCT Filed: Dec. 20, 2017

(86) PCT No.: PCT/EP2017/083959
§ 371 (c)(1),
(2) Date: Jun. 21, 2019

(87) PCT Pub. No.: WO2018/115209
PCT Pub. Date: Jun. 28, 2018

(65) Prior Publication Data
US 2019/0351408 A1  Nov. 21, 2019

(30) Foreign Application Priority Data
Dec. 22, 2016  (EP) .................................. 16206525

(51) Int. Cl.
*B01L 3/00*   (2006.01)

(52) U.S. Cl.
CPC ..... *B01L 3/50273* (2013.01); *B01L 3/502761* (2013.01); *B01L 3/502784* (2013.01);
(Continued)

(58) Field of Classification Search
CPC .......... B01L 3/50273; B01L 3/502761; B01L 3/502784; B01L 2200/0652;
(Continued)

(56) References Cited

U.S. PATENT DOCUMENTS

| 2004/0151629 A1* | 8/2004 | Pease | ...................... | B01L 7/525 |
| | | | | 422/68.1 |
| 2008/0038839 A1* | 2/2008 | Linder | ............. | G01N 33/54386 |
| | | | | 436/501 |

(Continued)

FOREIGN PATENT DOCUMENTS

WO    2016/079269 A1    5/2016

OTHER PUBLICATIONS

PCT International Search Report and Written Opinion, PCT International Application No. PCT/EP2017/083959, dated Feb. 7, 2018, 12 pages.

*Primary Examiner* — Jennifer Wecker
*Assistant Examiner* — Oyeleye Alexander Alabi
(74) *Attorney, Agent, or Firm* — McDonnell Boehnen Hulbert & Berghoff LLP

(57) ABSTRACT

A micro-fluidic device is provided to sort out objects from a liquid stream. The device comprises a first channel comprising a first liquid and a second channel comprising a second liquid and the first liquid, and a third channel. The second channel is connected to the first channel and the channels are positioned such that a jet flow coming from the second channel can deflect objects in the first liquid into the third channel. The first liquid is a liquid which has a higher viscosity than water and the second liquid may be the same as or different from the first liquid. The micro-fluidic device is adapted for generating the jet flow in the second liquid.

18 Claims, 6 Drawing Sheets

(52) U.S. Cl.
CPC ............... *B01L 2200/0652* (2013.01); *B01L 2200/0673* (2013.01); *B01L 2300/0816* (2013.01); *B01L 2300/1827* (2013.01)

(58) Field of Classification Search
CPC ..... B01L 2200/0673; B01L 2300/0816; B01L 2300/1827
See application file for complete search history.

(56) References Cited

U.S. PATENT DOCUMENTS

| | | | | |
|---|---|---|---|---|
| 2011/0120562 | A1* | 5/2011 | Tan | B01L 3/5027 137/1 |
| 2011/0193259 | A1* | 8/2011 | Howell, Jr. | B01L 3/00 264/172.15 |
| 2012/0142010 | A1* | 6/2012 | Mathies | B01L 3/50273 435/6.12 |
| 2012/0236299 | A1* | 9/2012 | Chiou | G05D 11/13 356/301 |
| 2015/0328637 | A1* | 11/2015 | Perrault, Jr. | B01L 3/502738 435/287.1 |
| 2016/0136643 | A1* | 5/2016 | Larson | B01F 13/0071 506/2 |

* cited by examiner

MICROFLUIDIC DEVICE FOR SORTING OUT DROPLETS

CROSS-REFERENCE TO RELATED APPLICATION

The present application is a section 371 U.S. national phase of PCT/EP2017/083959, filed Dec. 20, 2017, which claims priority to EP patent application No. 16206525.4, filed on Dec. 22, 2016, the contents of each of which are hereby incorporated by reference.

FIELD OF THE DISCLOSURE

The present disclosure relates to the field of micro-fluidic devices to sort out objects from a liquid stream. More specifically it relates to a micro-fluidic device to sort out objects from an oil stream.

BACKGROUND

One increasing trend in the field of microfluidics is droplet fluidics for rare bio-analyte (molecules or cells) analysis. Rare target cells are very difficult to detect or capture because they are surrounded by many more irrelevant molecules. In droplet fluidics, individual molecules are encapsulated in a single water-based droplet. As a result, the signal of every droplet becomes either fully positive "1" (for droplets containing the target molecule) or fully negative "0" (for droplets containing irrelevant molecules). In other words, the signal becomes "digital". In practice, droplet fluidics is created by segmented flow, by mixing oil and water at controlled flow rates to generate thousands of microdroplets per second that can reach the picoliter volume size. Afterwards, multiple reactions can take place on all droplets simultaneously in the same vessel. In this way, several teams and companies have successfully demonstrated the capability of droplet fluidics for rare molecule or cell analysis. However, many applications, such as cancer therapeutics, demand isolation of the "positive" droplets from the rest for downstream analysis such as DNA sequencing. This need has been addressed by several attempts such as dielectrophoretic droplet sorting.

A sorting system may for example comprise encapsulation of single yeast cells from a mutant library in droplets together with a fluorogenic enzyme substrate followed by sorting of droplets based on the fluorescent signal produced by digestion of the substrate by the target enzyme. The encapsulation of the cell in the droplet links the cell phenotype (secreted enzyme) to genotype (yeast cell) and the fluorogenic substrate enables measurement of the enzyme concentration. Sorting of droplets is done by flowing the droplets past the sorting junction and measuring the fluorescence of each droplet which passes a fluorescence exciting laser. If the droplet fluorescence exceeds a predefined threshold, a powerful electric field is automatically activated pulling the droplet of interest to a separate outlet. The cell in the sorted droplet can subsequently be recovered for further analysis. Such a system can for example have a sorting rate of about 400 Hz.

Droplet sorting may for example be done by an electrode next to the channel. When a cell is optically detected an AC voltage is applied to the electrode so that an electric field is created in the channel. This electric field can thereby influence the movement of the droplet.

There is still room for improvement in techniques for sorting droplets especially with regard to the sorting performance (e.g. the sorting speed).

SUMMARY

Embodiments described in the present disclosure provide a device which can sort out objects from a liquid stream, such as an oil stream. The objects may for example be droplets in a sequential droplet flow.

A first embodiment relates to a micro-fluidic device to sort out objects from a liquid stream. The device comprises a first channel comprising a first liquid, a second channel comprising a second liquid and the first liquid, and a third channel, wherein the second channel is connected to the first channel, wherein the channels are positioned such that a jet flow coming from the second channel can deflect objects in the first liquid into the third channel, wherein the first liquid has a higher viscosity than water, wherein the second liquid may be the same as or different from the first liquid, and wherein the micro-fluidic device is adapted for generating the jet flow in the second liquid.

The jet flow in the second liquid may be generated hydrodynamically, using a MEMS device, using a heater, using external pneumatic pressure pulses, using piezoelectric actuation, or using any other source suitable for generating the jet flow in the second liquid.

Some embodiments of the present disclosure enable the device to deflect objects in a stream of a first liquid which has a higher viscosity than water. Such a first liquid stream may for example be an oil stream and such an object may for example be a droplet which encapsulates a molecule, a cell, or a particle (e.g. a sub-cellular structure such as an exosome). The droplet is present in the first liquid. Typically bio-analyte encapsulating water droplets are immersed in oil. It is therefore beneficial that a jet flow can be created in an oil stream which enables it to sort out the droplets from the oil stream. A micro-fluidic device according to embodiments of the present disclosure may be especially useful in applications where rare biomolecules or cells (e.g. less than 1%) are targeted to be isolated for analysis.

In some embodiments, an oil-water interface of water droplets immersed in oil allows the droplets to be conveniently detected optically, e.g. based on the detection of a droplet edge.

In some embodiments, objects in the first liquid can be sorted out from the liquid stream. This can be done by generating a jet flow in the second liquid to deflect them into a third channel. The objects may for example be water droplets and the first liquid may for example be oil.

In some embodiments, the micro-fluidic device comprises a heater adapted for generating at least one microbubble in the second liquid for generating the jet flow from the second channel.

In some embodiments, the heater is adapted for generating at least one microbubble in the first liquid causing a jet flow from the second channel which deflects objects in the first liquid into the third channel. This enables the device to select objects in the liquid stream in the first channel by selectively generating a jet flow. In some embodiments, the volume expansion caused by the microbubble produces a jet flow which allows the device to sort out an object from the liquid stream in the first channel. In some embodiments, miniaturization of the microfluidic device allows parallelization and multiplexing.

In some embodiments, the first and second liquid are the same.

In other embodiments, the second liquid is different from the first liquid. In these embodiments the interface between the first and the second liquid is present in the second channel.

In some embodiments the interface between the first and second liquid is in the second channel. Thereby leaks of the second liquid into the first channel can be avoided. The micro-fluidic device may be designed such that the interface stays in the second channel when generating a jet flow in the second liquid.

The second liquid may have a lower boiling temperature than the first liquid. When such embodiments comprise a heater, the heater may be immersed in the second liquid.

In some embodiments the device is adapted for generating the at least one microbubble in a second liquid, which has a lower boiling point than the first liquid. The amount of heat used to generate the at least one microbubble may not be as high as when the heater is immersed in the first liquid (e.g. oil). Therefore, in some embodiment the sorting rate can be increased when using a second liquid with a lower boiling temperature than the first liquid. The second liquid may for example be water. In some embodiments, the power of the microbubbles is coupled to the first liquid via the interface between the first and the second liquid. When the microbubbles are generated they push the interface towards the first channel resulting in a jet flow produced by the microbubbles. In some embodiments, the power generated by the microbubbles is conserved in the pathway because neither the first liquid nor the second liquid are compressible. In some embodiments, the second channel is an elongated channel. In some embodiments, this channel is half filled with the first liquid and half filled with the second liquid. In some embodiments, the second channel is dimensioned such that water is not lost into the first channel when pushing the interface by way of the microbubbles. Accordingly, in some embodiments the interface remains stable over a plurality of strokes. More reproducible sorting of the object may be possible when using embodiments according to the present disclosure compared to for example electrostatic droplet sorting. In embodiments where the second liquid is different from the first liquid, the sorting is less dependent of the channel material or droplet/first liquid (e.g. oil) composition of the first channel than in cases where electrostatic droplet sorting is applied.

In some embodiments, the device comprises a monitor for monitoring the interface between the first and the second liquid.

In some embodiments, the state of the interface is monitored by a monitor. Thus it may be possible to control whether and to what extent the interface returns to its original state after being disrupted by the microbubbles. When repeatedly applying a stroke the interface may become blurred, resulting in a grey zone between the first and second liquid instead of a clear interface. In example embodiments, this can be detected by a monitor, which allows the device to take measures to compensate for this blurring effect. In some embodiments, more of the second liquid is inserted into the heating chamber or another location at the heater side of the second liquid, which may push the interface more towards the first channel side. In some embodiments adding the second liquid at the heater side may cause the second liquid to enter the first channel. After removing some of the second liquid the interface may lower into the second channel. This allows a user of the device to restore the interface between the first liquid and the second liquid. In embodiments that include a monitor system, it may be possible to avoid the first liquid entering the heating chamber by knowing the state and the position of the interface and compensating for the loss of the interface in time. In some embodiments, the monitor detects when an amount of the first liquid enters into the second channel, and upon detection, the interface level may be restored by removing the first liquid. The interface monitoring may be done by optical interface detection (imaging or refraction index detection). It may also be done by one or more embedded electrodes at the interface area. The electrodes may identify the liquid type by measuring for example the electrical impedance (or, additionally or alternatively, the resistance) of the liquid. This is possible when there is a conductivity difference between the two liquids. The first liquid may for example be an oil and the second liquid may for example be water based. The conductivity of a water based solution can for example be set between 9e-5 S/m and 10 S/m, while the oil conductivity is normally lower, e.g. 2e-14 S/m for FC-40 oil. Therefore, by measuring the liquid impedance of the liquid with electrodes, the monitor system can distinguish if the liquid is the water-based solution (low impedance) or oil (high impedance).

In some embodiments, the first and second liquid are separated by a gas plug in the second channel.

In some embodiments, a more stable interface may be obtained by having a gas plug in between the first and second liquid, however, in other examples the interface may be formed by a direct contact between the first and second liquid.

In some embodiments, the second channel comprises an additional chamber and the gas plug is captured in the additional chamber.

In some embodiments, the gas plug is trapped inside the additional chamber. For example, the channels on both sides of the chamber may be narrower than the additional chamber, making it difficult to squeeze the gas plug into the channels connected with the additional chamber. By carefully designing the ratio of the channel diameter and the additional chamber diameter, a microfluidic device may beneficially capture the gas plug in the additional chamber. The gas plug may for example fill half of the additional chamber.

In some embodiments, the microfluidic device comprises hydrophilic pillars in the chamber for defining an interface between the second liquid and the gas plug.

In some embodiments, the second liquid is the same as the first liquid.

In some embodiments, the device further comprises a feedback loop comprising an optical detector for detecting the edge of an object in the first channel and a feedback system for providing information of the presence of an object for determining the generation of the jet flow in the second liquid.

In some embodiments, the device comprises a controller for controlling actuation signals for generating a jet, whereby the actuation signal may comprise a tapered leading edge and optionally a tapered trailing edge. The tapered trailing edge may beneficially maintain the integrity of the object, allowing for the creation of smoother jets.

In some embodiments, the device comprises a hydrophobic coating on one or more walls of the first channel, which prevents the aqueous phase from binding to the walls. The hydrophobic coating may be a coating that generates a water contact angle higher than 100° on the walls of the first channel. The hydrophobic coating may be a perfluorodecyltrichlorosilane (FDTS) monolayer.

In some embodiments, the hydrophilic pillars form a barrier for the second liquid.

In some embodiments, the microfluidic device comprises an additional channel adapted for controlling the size of the gas plug.

In some embodiments, according to the present invention the second liquid is water.

When generating microbubbles, the interface between the first and second liquid is disrupted. In some embodiments, the properties of water and oil allow the interface to return approximately to its original state.

In some embodiments, the microfluidic device includes a stabilizer adapted for stabilizing the interface between the first and second liquid.

By using a stabilizer, the interface may more easily return to its original state after disruption by the microbubbles.

In some embodiments, the second channel is an elongated channel.

In some embodiments, the heater comprises a stack including a metal layer in between a first and a second passivation layer, wherein the stack is on top of a first layer which is a semiconductor substrate or glass layer.

The metal layer of the heater can be used as heating material. In some embodiments, this metal layer is not in direct contact with the second liquid. In some embodiments, the second liquid is heated through the top passivation layer (the second passivation layer furthest away from the semiconductor substrate or glass layer).

In some embodiments, the metal layer comprises aluminium or tungsten.

In some embodiments, the first passivation layer between the semiconductor substrate or glass layer and the metal layer is a layer with a lower thermal conductivity than the second passivation layer.

In some embodiments, the first passivation layer is a $SiO_2$ layer and/or the second passivation layer is a SiN layer. In some embodiments, the first passivation layer is a $SiO_2$ layer and/or the second passivation layer is a SiN+SiC layer. This may typically result in the following stack: silicon/$SiO_2$/W/SiN/SiC. In some embodiments, the first passivation layer is a layer with a lower thermal conductivity than the second passivation layer. This configuration of the passivation layers may prevent heat from going to the semiconductor substrate or glass layer, and may result in heat going to the second liquid. This may be particularly beneficial when the second liquid is an oil having a high boiling temperature and a low heat conductivity and slow dynamics (for example with regard to water). By increasing the heat transfer from the heater to the second liquid, the sorting rate of the device can be increased. In some embodiments, cooling may be implemented by cooling down the chip substrate (e.g. silicon) from the backside (this is the side opposite to the side of the fluidic layer). In some example embodiments, the heath pathway to the semiconductor substrate or glass side is blocked. The first passivation layer may for example be a $SiO_2$ layer and the second passivation layer a SiN layer. Conventional approaches do not introduce a $SiO_2$ layer into the stack of the metal layer, the semiconductor substrate and the SiN layer, because of the different thermal expansion coefficient of the $SiO_2$ layer compared to the thermal expansion coefficient of the other materials in the stack. $SiO_2$, for example, has a lower thermal conductivity than SiN. If the first passivation layer would be a SiN layer, more heat may be transferred to the semiconductor substrate or glass layer.

In some embodiments, the microfluidic device comprises a plurality of heaters. In various embodiments, a plurality of heaters may be used in tandem in a multitude of ways, e.g. to improve a jet stream formation by combining microbubbles formed by several heaters, to counteract a push or pull phase (cf. infra) of a jet stream and/or to sort objects across a plurality of third channels.

In a second aspect, embodiments according to the present disclosure relate to a diagnostic device for diagnosing a status of a patient, the diagnostic device comprising: a microfluidic device to sort out objects from a liquid stream; and an output device for determining a quality or quantity of the objects and for providing an output based thereon on which a diagnosis can be based. In a third aspect embodiments of the present disclosure relate to an industrial inspection device for inspecting a liquid flow comprising objects, the industrial inspection device comprising: a microfluidic device to sort out objects from a liquid stream; and an output device for determining a quality or quantity of the objects and for providing an output based thereon for characterizing the liquid flow.

In a fourth aspect embodiments of the present disclosure relate to a method for forming a micro-fluidic device according to embodiments of the first aspect. The method may comprise providing a substrate comprising at least one jet flow actuator for generating the jet flow in the second liquid; providing a structural layer over the substrate; patterning the structural layer in such a way that the structural layer comprises at least one channel exposing the at least one jet flow actuator; and providing a cover over the structural layer, the cover comprising at least one access to the at least one micro-fluidic channel. The method may further comprise modifying the hydrophobicity of a surface of the micro-fluidic channel. Modifying the hydrophobicity of the surface of the micro-fluidic channel may for example comprise changing a hydrophilic surface (e.g. having a water contact angle of 30° or less) into a hydrophobic surface (e.g. a surface having a water contact angle of 90° or more, such as 100°). Hydrophobic surfaces may be useful in making the microfluidic device more compatible with the use of hydrophobic liquids (e.g. first liquids), such as oils.

Particular and preferred aspects are set out in the accompanying independent and dependent claims. Features from the dependent claims may be combined with features of the independent claims and with features of other dependent claims, and not merely as explicitly set out in the claims.

These and other aspects will be apparent from and elucidated with reference to the embodiment(s) described hereinafter.

DETAILED DESCRIPTION OF ILLUSTRATIVE EMBODIMENTS

Figure 1:
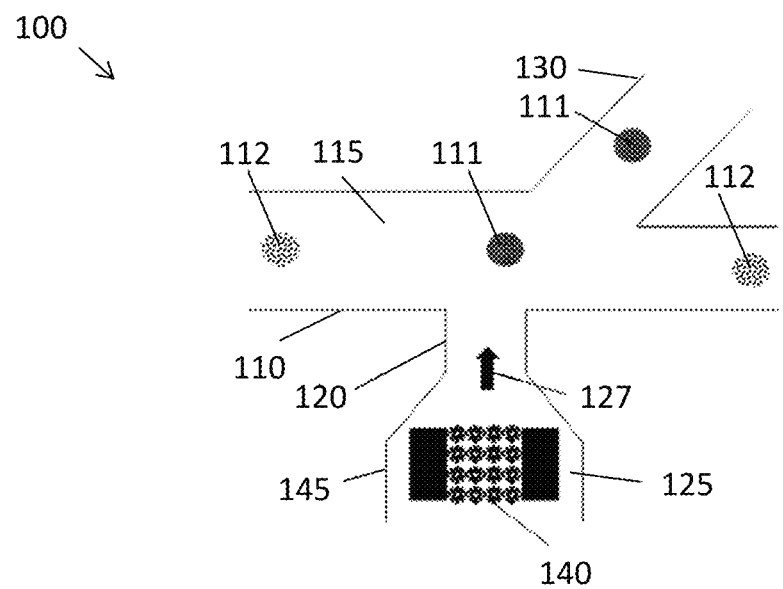
FIG. 1 schematically illustrates a micro-fluidic device, wherein the first liquid is the same as the second liquid in accordance with an example embodiment.

The present disclosure will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice.

The terms first, second and the like in the description and in the claims, are used for distinguishing between similar elements and not necessarily for describing a sequence, either temporally, spatially, in ranking or in any other manner. It is to be understood that the terms so used are interchangeable under certain circumstances and that the embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under certain circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the particular embodiment, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

Where in embodiments reference is made to a stroke, reference is made to a jet flow caused by the generation of at least one microbubble in the second liquid.

Embodiments of the present disclosure relate to a micro-fluidic device for isolating objects in a liquid stream. The micro-fluidic device comprises a first channel comprising a first liquid. In some embodiments the objects are water droplets and the first liquid may be any immiscible liquid that presents higher viscosity than the water phase at the droplet generation point to create a fragmented flow. In some embodiments the first liquid may be an oil. In some embodiments the flow rate of the first liquid (e.g. oil) may be the same or higher than the flow rate of the water phase in order to create a segmented droplet flow. The flow rate of the oil may for example be twice the flow rate of the water. The droplets may have captured one or more cells or molecules. During operation the droplets pass through the first channel. Micro-fluidic devices, according to some embodiments sort out certain droplets which are passing through the first channel.

The micro-fluidic device, according to some embodiments, comprises a second channel which is connected to the first channel and a third channel. The first channel and the third channel are positioned such that a jet flow coming from the second channel can deflect objects (e.g. droplets) which are present in the first channel, into the third channel.

For generating the jet flow, the micro-fluidic device comprises a heater. This heater is immersed in a second liquid in a chamber connected to the second channel. The heater is adapted for generating at least one microbubble in the second liquid. The microbubble(s) induce the jet flow from the second channel. In some embodiments, a plurality of microbubbles may be used to generate an efficient jet flow.

In some embodiments, the second liquid is the same as the first liquid and both are an oil. In these embodiments an oil vapor bubble is created by the heater. The oil may be heated above the boiling temperature of the oil which may for example be between 150-180° C. In these embodiments, the heater may be adapted for generating an oil vapor bubble. The heater may comprise a number of hotspots which can be heated by applying a current pulse to the heater. The current pulse may for example have a duration of about half of the time that the droplet travels through the sorting junction. the sorting junction is the T junction between the first channel and the second channel. The current pulse may for example have a duration between 5 µs and 1 ms. The current pulse height may for example be between 1 amp and 10 amp, for example between 1 amp and 5 amp. This heating of the hotspots generates the vapor bubbles of the second liquid which in turn induces the jet flow from the second channel towards the first channel. After the current pulse is turned off, the vapor bubbles collapse and the heater is restored to be ready for the next sorting.

In some embodiments, the heater is adapted for generating at least one microbubble in the second liquid. The heater may therefore comprise a stack of layers wherein a metal layer is positioned between a first and a second passivation layer. The metal layer may be adapted for generating heat when sending a current through it. It may for example comprise aluminium or tungsten. The first passivation layer may be mounted on a substrate (e.g. glass or semiconductor substrate). In some embodiments, the first passivation layer is a $SiO_2$ layer and/or the second passivation layer is a SiN+SiC layer. This may result in the following stack: silicon/$SiO_2$/W/SiN/SiC. Other possible choices are: first passivation=SiN, second passivation=$SiO_2$ or SiN (single material) or $SiO_2$/SiC, $SiO_2$/Ta, SiN/Ta.

The second passivation layer may be closest to the second liquid during operation of the microfluidic device. The first passivation layer may have a lower thermal conductivity than the second passivation layer. Thus resulting in a heat flow towards the second liquid.

When the first liquid and the second liquid are the same oil, the oil may have a low boiling temperature. The oil compositions may for example be used as carrier for the objects which may be water droplets generated on a T-junction area at the first channel (before the T-junction area between the first channel and the second channel). In an example embodiment, FC-40 may be used. FC-40 is fluorinated oil manufactured by 3-M company. FC-40 has a clear/transparent fluid and presents a boiling point at 165° C. Its liquid density is 1855 kg/m$^3$ and it presents a refractive index of 1.29 and dielectric constant of 1.9.

Additionally or alternatively, HFE7500 may be used. HFE7500 Novec is a fluorinated oil that presents a boiling point of 128° C. This oil is a clear fluid with liquid density of 1614 kg/m$^3$. Its refractive index is 1.39 and dielectric constant is 5.8.

FIG. 1 schematically shows a micro-fluidic device 100, wherein the first liquid 115 is the same as the second liquid 125, in accordance with an example embodiment. The first and second liquid may be an oil. The micro-fluidic device 100 comprises a first channel 110 comprising the first liquid 115. In this example the first liquid can flow through the first channel and comprises water droplets. Some of these are wanted water droplets 111 and others are unwanted water droplets 112. The micro-fluidic device comprises a second channel 120 connected to the first channel 110, and a heater 140. In this example the heater 140 is immersed in the second liquid 125 in a heating chamber 145 connected to the second channel 120. In some embodiments the heater 140 is adapted for heating the oil, the oil being the second liquid. By heating the oil an oil vapor bubble can be generated. This vapor bubble causes a jet flow 127 from the second channel 120 and this jet flow 127 can deflect the wanted water droplet 111 into a third channel 130 which is also connected to the first channel 110.

In yet another embodiment, the micro-fluidic device 100 comprises a first channel 110 adapted for flowing a first liquid 115, a second channel 120 connected to the first channel 110 and a third channel 130, positioned such that, during operation, a jet flow 127 coming from the second channel 120 can deflect objects in the first liquid into the third channel 130. The second channel 120 is dimensioned such that it can contain a first 115 and a second liquid 125 such that the interface 150 between the first and second liquid is in the second channel 120 when both liquids are in rest and also when microbubbles generated in the second liquid 125 result in a jet flow from the second channel 120. The micro-fluidic device comprises a heater 140 adapted for generating microbubbles in the second liquid 125 during operation of the micro-fluidic device. During operation the heater 140 is immersed in the second liquid 125. The width and height of the second channel 120 may be selected to improve operation of the device. For example, a smaller channel can minimize the disturbance of the interface 150 between the first and the second liquid during a sorting cycle, and a larger channel can decrease resistance towards liquid flow in order to increase the jet flow power. In some embodiments, the channel width and height of the second channel may for example be between 5 and 100 µm.

Figure 2:
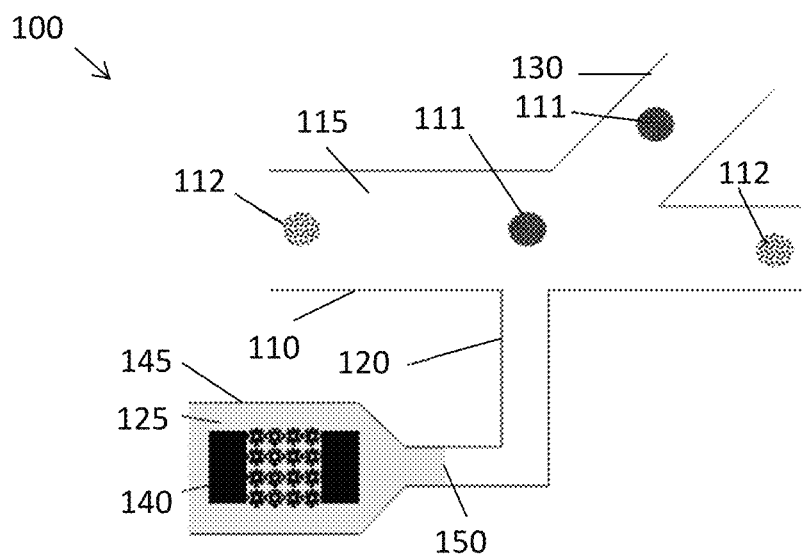
FIG. 2 schematically illustrates a microfluidic device comprising a second channel which is adapted for containing a first and a second liquid in accordance with an example embodiment.

FIG. 2 schematically shows a microfluidic device 100 comprising a second channel 120 which is adapted for containing a first 115 and a second 125 liquid in accordance with embodiments of the present disclosure.

FIG. 2 shows a heater 140 in a heating chamber 145 connected to a second channel 120 wherein the second channel is connected to a first channel 110. The second channel is dimensioned such that the interface 150 between the first and second liquid is present in the second channel 120 (in rest and also when a jet flow is generated). The dimensioning may comprise dimensioning the length and/or the width of the second channel. In this embodiment the second liquid 125 is water. The second liquid fills the heating chamber 145 and the second channel has both a water segment 125 and an oil segment 115. Vapor bubbles created in the heating chamber 145 lead to jet flow which propagates to the second channel and finally to the first sorting channel. During the entire jet flow resting and firing process, the water-oil interface 150 remains in the second channel 120 to prevent oil from entering the heating chamber 145 or water from entering the first channel 110. A microfluidic device 100 as in FIG. 2 may use less heat to produce the jet flow compared with oil vapor bubble nucleation, because the boiling temperature of water is usually much lower than that of oil. In such examples, the entire device is less heated and thus the device may be more durable and a higher sorting speed may be realized.

Figure 3:
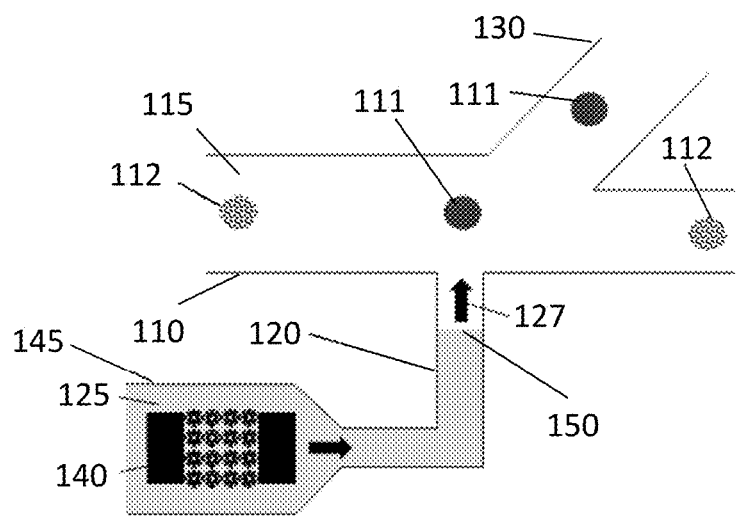
FIG. 3 illustrates the interface position in the microfluidic device of FIG. 2 when the heater fires a jet flow, in accordance with an example embodiment.

FIG. 3 shows the same microfluidic device 100 as in FIG. 2 when the heater heats the second liquid resulting in a jet flow. While FIG. 2 shows the interface position 150 when the heater is at rest, FIG. 3 shows the interface position 150 when the heater fires a jet flow 127.

In some embodiments, the second liquid 125 and the first liquid 115 are separated by a gas plug 410 in the second channel 120 (the interface between the first and second liquid is thereby formed by the air plug). This gas plug may be an air plug, for example an air bubble. The second channel 120 may be designed such that during some or all of the sorting process the gas plug 410 remains inside the second channel 120.

In embodiments wherein the first and second liquid are separated by a gas plug, controlling of the microbubbles generation may take into account the dynamics of the gas plug. The dynamics of such a system may be different because the air is compressible. The interface dynamics may also be dependent on the temperature. This may also be taken into account when generating the microbubbles.

Figure 4:
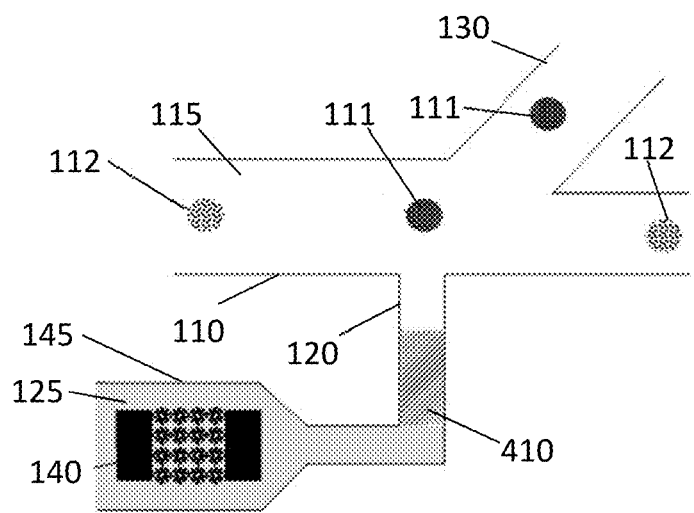
FIG. 4 schematically illustrates a microfluidic device comprising a gas plug in between the first and the second liquid in accordance with an example embodiment.

FIG. 4 schematically shows a microfluidic device 100 comprising a gas plug 410 in between the first 115 and the second liquid 125 in accordance with embodiments of the present disclosure.

Figure 5:
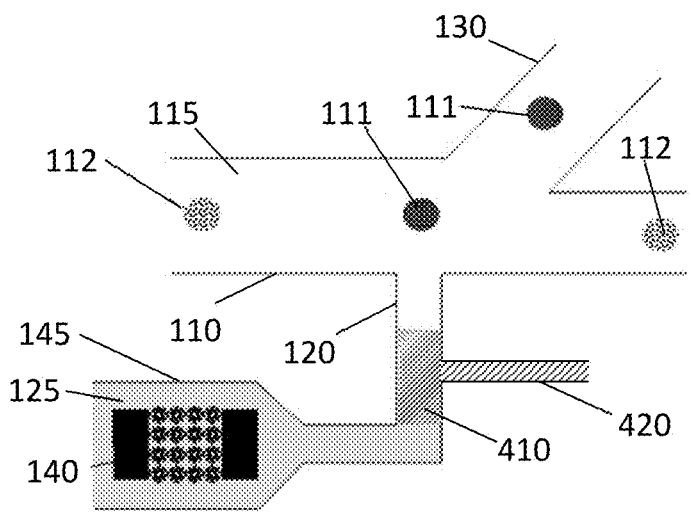
FIG. 5 illustrates a microfluidic device comprising an additional channel adapted for controlling the size of the gas plug, in accordance with an example embodiment.

FIG. 5 shows a microfluidic device 100 according to another example embodiment. The microfluidic device comprises an additional channel 420 adapted for controlling the size of the gas plug. The additional channel 420 is connected with the second channel 120 at a position such that the second channel can contain a gas plug 410 in between the first liquid 115 and the second liquid 125.

In some embodiments, the gas plug 410 may be blocked in a certain position in the second channel 120 by providing dedicated structures in the second channel which prevent the gas plug from entering such a dedicated structure. In some embodiments, a slightly bigger chamber 510 may be introduced between two narrow channels.

Figure 6:
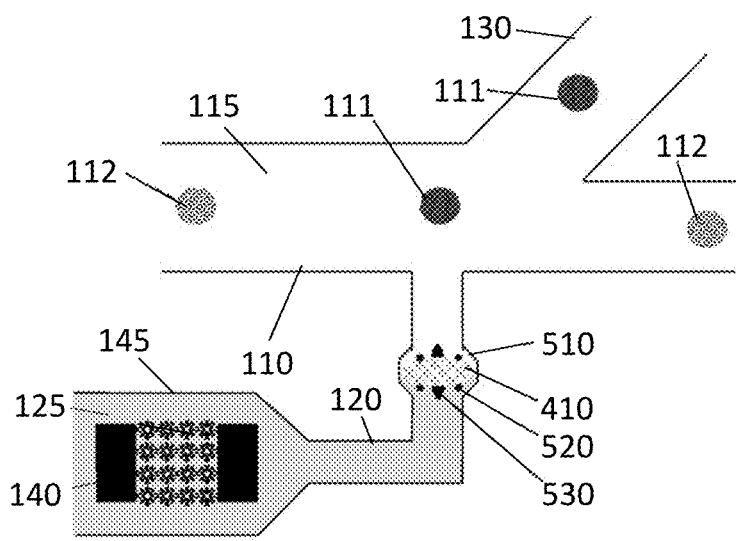
FIG. 6 schematically illustrates a microfluidic device comprising a chamber wherein the gas plug can be captured in the chamber in accordance with an example embodiment.

FIG. 6 schematically shows a microfluidic device comprising an additional chamber 510 wherein the gas plug 410 can be captured in accordance with embodiments of the present disclosure. Additionally hydrophilic pillars 520 are present in the chamber. These hydrophilic pillars 520 may form a barrier for the second liquid 125 between the heater 140 and the hydrophilic pillars 520. A hydrophilic pillar allows additional surface tension to hold liquid 125 (e.g. water) and therefore to trap a gas plug 410. Additionally pillars 530 may be present at the first liquid side 115. The interaction between the first liquid 115 (e.g. oil) and the pillars 530 can be varied, e.g. similar to water (e.g. "oilphilic", hydrophobic) or the opposite, depending on the oil property.

Hydrophilic pillars may be used to trap a gas plug 410 (as illustrated in FIG. 6; see pillars 510, 520, 530) or they may be used when no gas plug 410 is used. In either case, the hydrophilic pillar surface only interacts with a liquid. In the first method, the surface tension holds the second liquid 125 and consequently keeps the interface between the second liquid 125 and the gas plug 410 in the pillar array. In the second method, the surface tension holds the interface 150 between the first and second liquid in the pillar array.

In some embodiments, the pillar array may have much smaller attractive force on the first liquid or on the gas plug compared to the second liquid (because of surface hydrophilicity) and the pillar array may stop the second liquid up to a certain pressure level. This pressure level may depend on the design of the pillar array.

In some embodiments, the length of the pillar array is related to the stroke size (i.e. the displacement of the second liquid during a stroke). This length may for example be the double of the stroke size. In some embodiments, the interface between the second liquid and the gas plug or the interface between the first liquid and the gas plug resides between the pillar array and the heater during an entire sorting cycle. If for some reason the interfaces move too much toward the first channel, the pillar array may function as a safety valve to hold one of the interfaces.

A microfluidic device 100 comprising an additional chamber 510 in the second channel may be filled first by the second liquid 125 until the second liquid has immersed the heater and until the second channel is filled up to the chamber (e.g. up to the hydrophilic pillars 520). When filling up the second channel 120 with the first liquid 115 from the other side, a gas plug 410 may be trapped in the additional chamber 510 between the first liquid 115 and the second liquid 125. In some embodiments, the gas plug is as small as possible, in order to prevent that the gas plug from decreasing the efficiency of the jet flow power. In some embodiments, the gas volume is no larger than 10 times the total volume of all the vapor bubbles which are generated during one stroke. Depending on the dimensions of the second channel 120 and the additional chamber 510, the gas plug 410 may be captured inside the chamber 510 between the first liquid 115 and the second liquid 125. In some examples, pillars 520, 530 may be introduced to improve the stability of the gas plug. In some embodiments, the gas plug 410 does not fill the complete additional chamber 510.

In some embodiments, a sorting rate of more than 500 objects per second, or even more than 1000 objects/second, or even more than 2000 objects/second or even more than 5000 objects/second can be obtained. Depending on the embodiment, the sorting rate may be higher or lower. The sorting rate may be lower in an embodiment comprising an air plug interface because of power dampening by the air bubble. This can, however, be compensated for by extra jet flow power. In an embodiment wherein the first and second liquid are the same (e.g. oil), more heating may be used to produce bubbles and therefore an additional cooling mechanism may be provided to increase the sorting rate by decreasing the cooling time per jet flow cycle (i.e. per stroke).

In some embodiments, the time between droplets to be isolated may be below one second, or it may even be below 100 ms, or even below 10 ms, or even below 1 ms.

In some embodiments, the microfluidic device 100 comprises a plurality of jet flow actuators 140 (e.g. a heater). A plurality of jet flow actuators 140 can advantageously be used in tandem in a multitude of ways. In some embodiments, a plurality of jet flow actuators 140 can be present in a single second channel 120. In some embodiments, the plurality of jet flow actuators 140 in the single second channel 120 can be actuated simultaneously. The plurality of jet flow actuators 140 can be used to form a combined jet flow which is more powerful compared to a jet flow from a single jet flow actuator 140. This may for example allow a jet flow of the desired strength to be obtained faster, allowing in turn to achieve a higher sorting rate.

Figure 7:
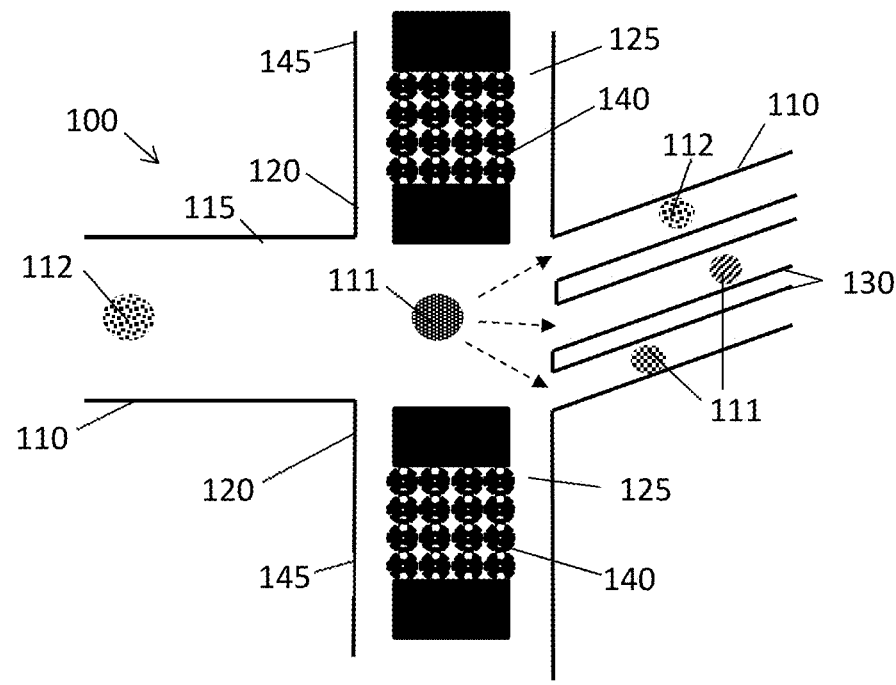
FIG. 7 schematically illustrates a micro-fluidic device comprising two heaters in accordance with an example embodiment.

In some embodiments, the plurality of actuators can reside on the same side of the droplet-carrying channel 110 or can be arranged different. A particular embodiment is illustrated by FIG. 7. In some examples, the plurality of actuators may be used to compensate the push-pull flow. Putting the heaters on the same side can do the same job as well. Also, on the same or different side, multiple actuators, e.g. heaters, may be used to support sequential firing, or sequential jet flow, which can help smoothen the total jet flow and which can avoid over-using or over-heating a single heater that might lead to early heater failure (when multiple heaters are used alternatingly, each heater will have sufficient time to cool down).

In some embodiments, a second jet flow actuator 140 can be actuated out of phase with respect to a first jet flow actuator 140. In some embodiments, a jet flow may be composed of two phases: a push phase, when microbubbles are created and eject an outbound jet flow, and a pull phase, when microbubbles collapse and retract an inbound jet flow. Either one of these phases may be used for sorting, dependent on the timing set by the user. In certain circumstances, two objects in the first channel 110 may be too close to each other. In such a situation, after pushing the first object, the second object may be caught in a pull phase. As a result, the second cell may be wrongfully sorted. To overcome this, the second jet flow actuator 140 may be positioned and actuated such that the force created by its push (or pull) phase cancels out the pull (or push) phase of the first jet flow actuator 140.

In some embodiments, the micro-fluidic device 100 can comprise a plurality of second channels 120, each comprising at least one jet flow actuator 140. This situation is depicted in FIG. 7. The plurality of jet flow actuators 140 across the plurality of second channels 120 can for example be used to sort objects (e.g. wanted water droplets 111) across a plurality of third channels 130, e.g. depending on their content as determined from an optical measurement.

It will be clear that several or all of these uses for the plurality of jet flow actuators 140 can in embodiments be combined. For example, a micro-fluidic device 100 may comprise a plurality of second channels 120, each comprising a plurality of jet flow actuators 140. Some of these jet flow actuators may be used to sort objects across different third channels 130. Other jet flow actuators 140 may be combined to improve (e.g. speed up) a jet stream formation. Meanwhile, some jet flow actuators 140 may be used to counteract e.g. an inconvenient pull or push phase.

Figure 8:
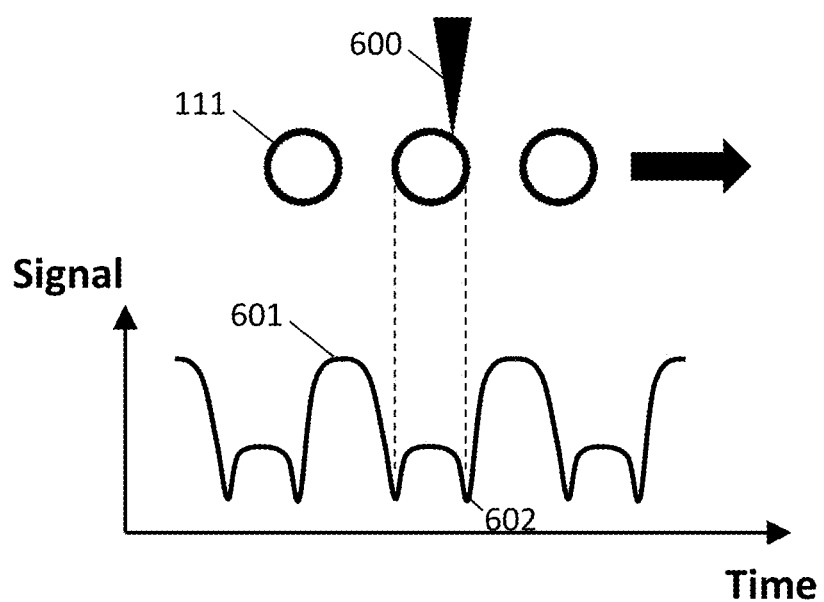
FIG. 8 schematically illustrates an optical signal measured on a stream of droplets in accordance with an example embodiment.

In some embodiments, wanted 111 and unwanted 112 objects (e.g. droplets) are detected and/or counted by an optical measurement. In some embodiments, the optical measurement may comprise an edge detection. Droplet sorting can conventionally be achieved by detecting a scatter signal; either forward scatter (FSC), side-scatter (SSC) or back scatter (BSC). Moreover, when the first liquid is an oil and the object is a water droplet, since the refractive index contrast between oil and water across the oil-water interface is considerable, it is conveniently possible to detect droplets by measuring the double-edge of the droplet. This is also the case for other objects, provided the refractive index contrast is sufficiently high. Additionally or alternatively, electrical measurement can be performed for droplet detection. The electrical measurement may be adapted for detecting the droplets by their electrical impedance in contrast to oil, since water has a different conductivity and dielectric permittivity from oil. The edge detection may be performed as an alternative or as an additional detection technique. In some embodiments, the optical edge detection can be performed close to the position where selection is to be performed, so that changes in speed have little or no effect on the selection. One embodiment of edge detection is illustrated in FIG. 8, at the top of which a stream of droplets 111 being measured by a light source 600 is schematically depicted. The bottom of FIG. 8 shows the corresponding measured optical signal 601, the signal 601 being characterized by valleys 602 corresponding to the double-edge.

Figure 9:
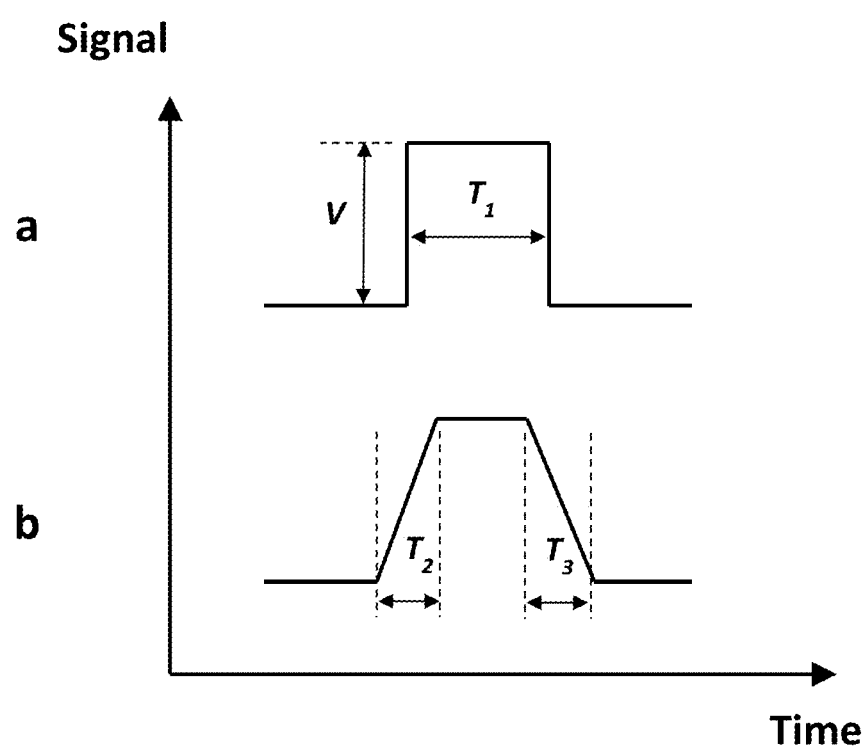
FIG. 9 schematically illustrates an actuation signals for actuating a heater in accordance with an example embodiment.

In some embodiments, it may be beneficial to also consider the droplet integrity during sorting. Unlike cells, which have a physical encapsulating membrane, droplets only preserve their physical integrity by their surface tension; therefore, a droplet's structural integrity is often weaker compared to cells. The forces to which the droplets are exposed during sorting may therefore be sufficiently mild in order not to damage or break open the droplet during sorting. Referring to FIG. 9a, one way to moderate the forces may be to enlarge the duration $T_1$ of the actuation signal, while lowering the amplitude V, thereby controlling the power of the jet stream. Additionally or alternatively, as shown in FIG. 9b, an actuation signal may be used with a leading edge which increases towards a maximum intensity over a duration $T_2$. Likewise, an abrupt cut-off of the jet stream may also lead to the droplet being exposed to excessive forces. The actuation signal can therefore be provided such that its trailing edge tapers down over a duration $T_3$. In some embodiments, an actuation signal for generating a jet flow (e.g. to a jet flow actuator 140) can comprise a tapered leading edge, and optionally a tapered trailing edge. The microfluidic device may thus comprise a controller for controlling actuation signals for generating a jet, whereby the actuation signal may comprise a tapered leading edge and optionally a tapered trailing edge.

In some embodiments, the walls of the first channel may be rendered hydrophobic by applying a hydrophobic coating thereto. The walls may be coated with a hydrophobic coating. The hydrophobic coating may be for example a hydrophobic perfluorodecyltrichlorosilane (PDTS) monolayer. In some examples, the hydrophobic coating may prevent droplets from sticking to the wall, thereby allowing for better selection of the droplets.

Figure 10:
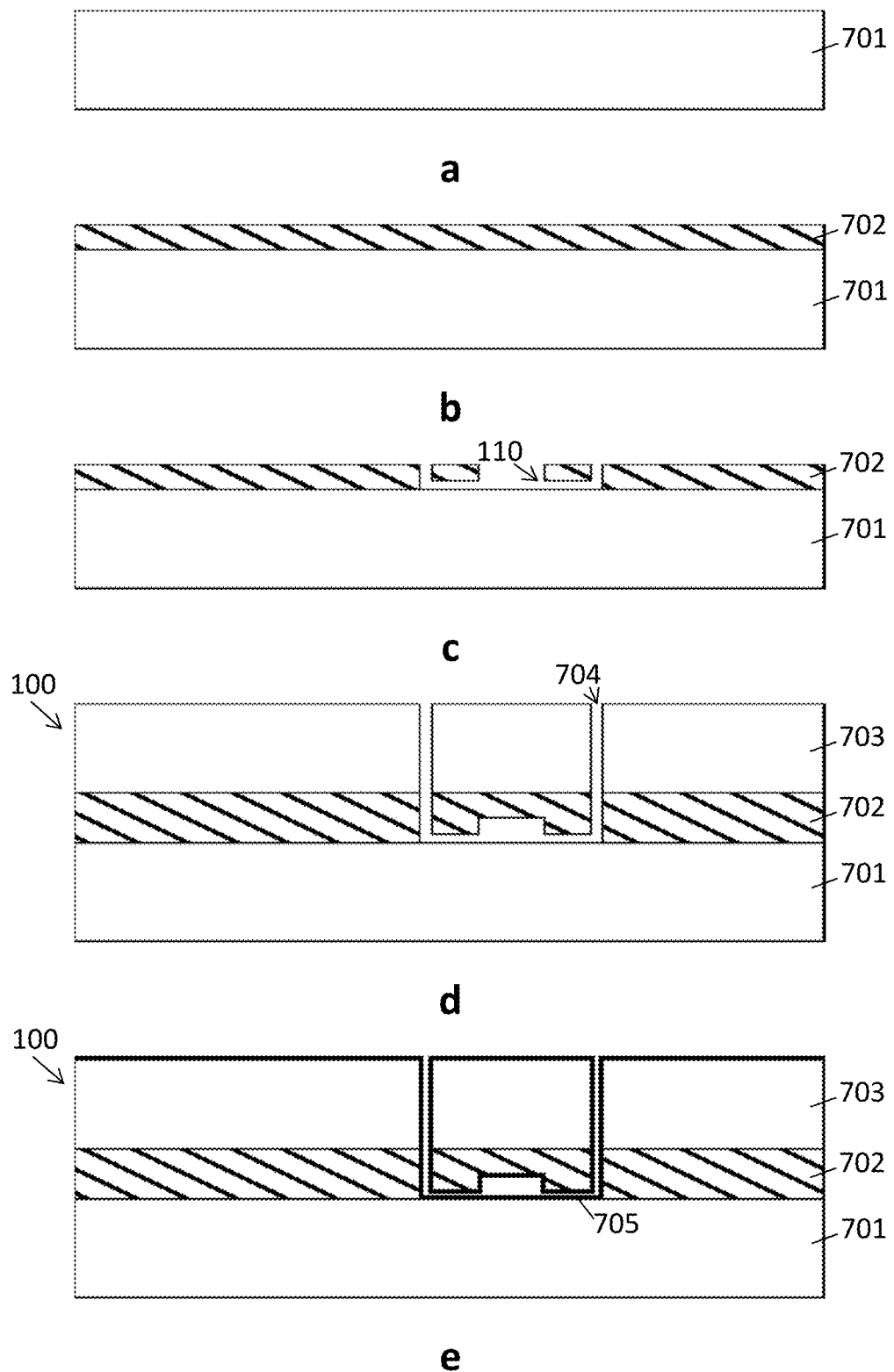
FIG. 10 schematically illustrates steps in a process for forming a micro-fluidic device to sort out objects from a liquid stream in accordance with an example embodiment.

A method for forming a micro-fluidic device 100 in accordance with an example embodiment is depicted in FIG. 10. Initially, a substrate 701 is provided (FIG. 10, a). The substrate 701 may be a semiconductor substrate (e.g. a Si substrate). The substrate 701 may have been processed to comprise one or more jet flow actuators for generating a jet flow in the second liquid in the final micro-fluidic device. These processing steps may typically be semiconductor technology processing steps, e.g. CMOS compatible processing steps. Subsequently, a structural layer 702 is provided over the substrate 701 (FIG. 10, b). The structural layer 702 may be a conformal polymer layer (e.g. polydimethylsiloxane, PDMS). The structural layer 702 is then patterned (FIG. 10, c), e.g. using a photolithography, to form therein one or more channels, such as the first 110, second 120 and/or third 130 channels; at least one channel providing an access to the one or more jet flow actuators. A cover 703 is subsequently provided over the structural layer 702 (FIG. 10*d*). The cover 703 may for example comprise a glass substrate, optionally itself covered with a bonding layer. The bonding layer may facilitate bonding of the cover with the structural layer 702. The bonding layer may for example be made of a same material as the structural layer 702, e.g. both being made of PDMS. In some examples, the cover comprises an access to the one or more channels in the structural layer 702. To this end, the cover 703 may be patterned with one or more openings 704; for example after bonding the cover 703 to the structural layer 702. Optionally, the method may further comprise modifying a hydrophobicity of exposed surfaces of the micro-fluidic device 100, such as by depositing a hydrophobic coating 705 over the surfaces (FIG. 10*e*). A hydrophobic perfluorodecyltrichlorosilane (PDTS) monolayer 705 may for example be deposited over the micro-fluidic device 100, e.g. by way of vapor deposition in an oven (e.g. at 120° C. for 120 min). Surfaces obtained in semiconductor technology may be hydrophilic in nature (e.g. being characterized by a water contact angle of 30° or less). These hydrophilic surface are typically less compatible with objects, such as droplets. Accordingly, in some examples a hydrophobic coating (e.g. characterized by a water contact angle of 90° or more, such as 100°) is applied over these the exposed surfaces.

The invention claimed is:

1. A micro-fluidic device to sort out objects from a liquid stream, the device comprising:
   a first channel configured for flow of a first liquid, the first liquid including a mixture of objects;
   a second channel configured for flow of a second liquid and the flow of the first liquid and configured to retain an interface formed between the first liquid and the second liquid and for preventing the flow of the second liquid into the first channel, wherein the first liquid has a higher viscosity than water, the second liquid is different from the first liquid, and the first liquid and second liquid are non-compressible;
a third channel configured for receiving selected objects from the mixture of objects, the second channel and third channel are connected to the first channel; and
a heating chamber connected to the second channel, the heating chamber comprising a heater configured to generate at least one microbubble in the second liquid for generating a jet flow from the second channel, the heating chamber connected to the second channel;
wherein the first channel, the second channel, and third channel are positioned such that, when the heater is configured to generate the at least one microbubble in the second liquid, the at least one microbubble is configured to push pushes the interface between the first liquid and second liquid towards the first channel, and to generate the jet flow coming from the second channel to deflect the selected objects in the first liquid into the third channel.

2. The micro-fluidic device according to claim 1, further comprising a feedback loop, wherein the feedback loop comprises an optical detector for detecting an edge of each object of the mixture in the first channel, and a feedback system for providing information of the presence of the object for determining the generation of the jet flow in the second liquid.

3. The micro-fluidic device according to claim 1, further comprising a controller for controlling actuation signals for generating a jet, wherein the actuation signals comprise a tapered leading edge and a tapered trailing edge.

4. The micro-fluidic device according to claim 1, further comprising a hydrophobic coating on one or more walls of the first channel.

5. The micro-fluidic device according to claim 4, wherein the hydrophobic coating is a perfluorodecyltrichlorosilane (PDTS) monolayer.

6. The micro-fluidic device according to claim 1, wherein the interface between the first liquid and the second liquid is formed by direct contact between the first liquid and the second liquid.

7. The microfluidic device according to claim 1, further comprising a monitor for monitoring the interface between the first liquid and the second liquid.

8. The microfluidic device according to claim 1, wherein the interface between the first liquid and the second liquid comprises a gas plug.

9. The microfluidic device according to claim 8, wherein the second channel further comprises an additional chamber, and wherein the gas plug is captured in the additional chamber.

10. The microfluidic device according to claim 9, wherein the additional chamber further comprises hydrophilic pillars.

11. The microfluidic device according to claim 8, wherein the second channel further comprises an additional channel adapted for controlling a size of the gas plug.

12. The microfluidic device according to claim 1, wherein the second liquid is water.

13. The microfluidic device according to claim 1, wherein the second channel is an elongated channel.

14. The microfluidic device according to claim 1, wherein the heater comprises a stack, the stack comprising a metal layer in between a first passivation layer and a second passivation layer, wherein the stack is on top of a semiconductor substrate layer or a glass layer.

15. The microfluidic device according to claim 14, wherein the first passivation layer has a lower thermal conductivity than the second passivation layer.

16. A diagnostic device for diagnosing a status of a patient, the diagnostic device comprising:
the microfluidic device according to claim 1; and
an output device, wherein the output device determines an integrity quality or a quantity of the selected objects and provides an output diagnosis based on the integrity quality or the quantity of the objects.

17. An industrial inspection device for inspecting a liquid flow comprising objects, the industrial inspection device comprising:
the microfluidic device according to claim 1; and
an output device, wherein the output device determines an integrity quality or a quantity of the objects and provides an output based on the integrity quality or the quantity of the objects, wherein the output characterizes the liquid flow.

18. A method for forming the micro-fluidic device according to claim 1, the method comprising:
providing a substrate comprising at least one jet flow actuator for generating the jet flow in the second liquid;
providing a structural layer over the substrate;
patterning the structural layer such that the structural layer comprises at least one micro-fluidic channel exposing the at least one jet flow actuator;
providing a cover over the structural layer, wherein the cover comprises at least one access to the at least one micro-fluidic channel; and
rendering a surface of the at least one micro-fluidic channel hydrophobic.

* * * * *